(No Model.)                              2 Sheets—Sheet 1.
J. GRANT.
UNDERGROUND CONDUCTOR FOR ELECTRIC WIRES.
No. 344,827.                              Patented July 6, 1886.
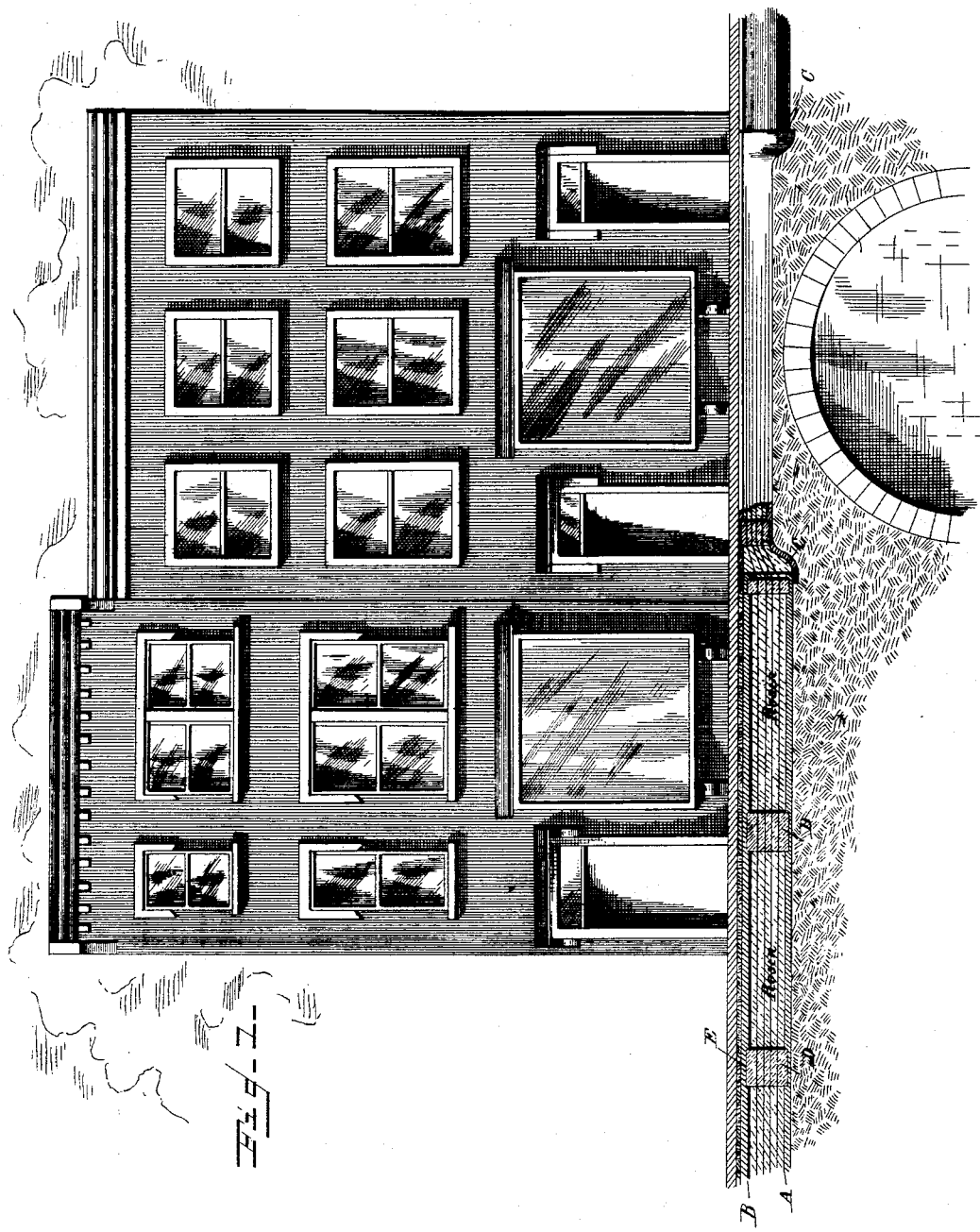
WITNESSES
Edwin T. Yewell,
INVENTOR
John Grant
By Yewell + Chapman
Attorneys.

(No Model.) 2 Sheets—Sheet 2.
J. GRANT.
UNDERGROUND CONDUCTOR FOR ELECTRIC WIRES.
No. 344,827. Patented July 6, 1886.
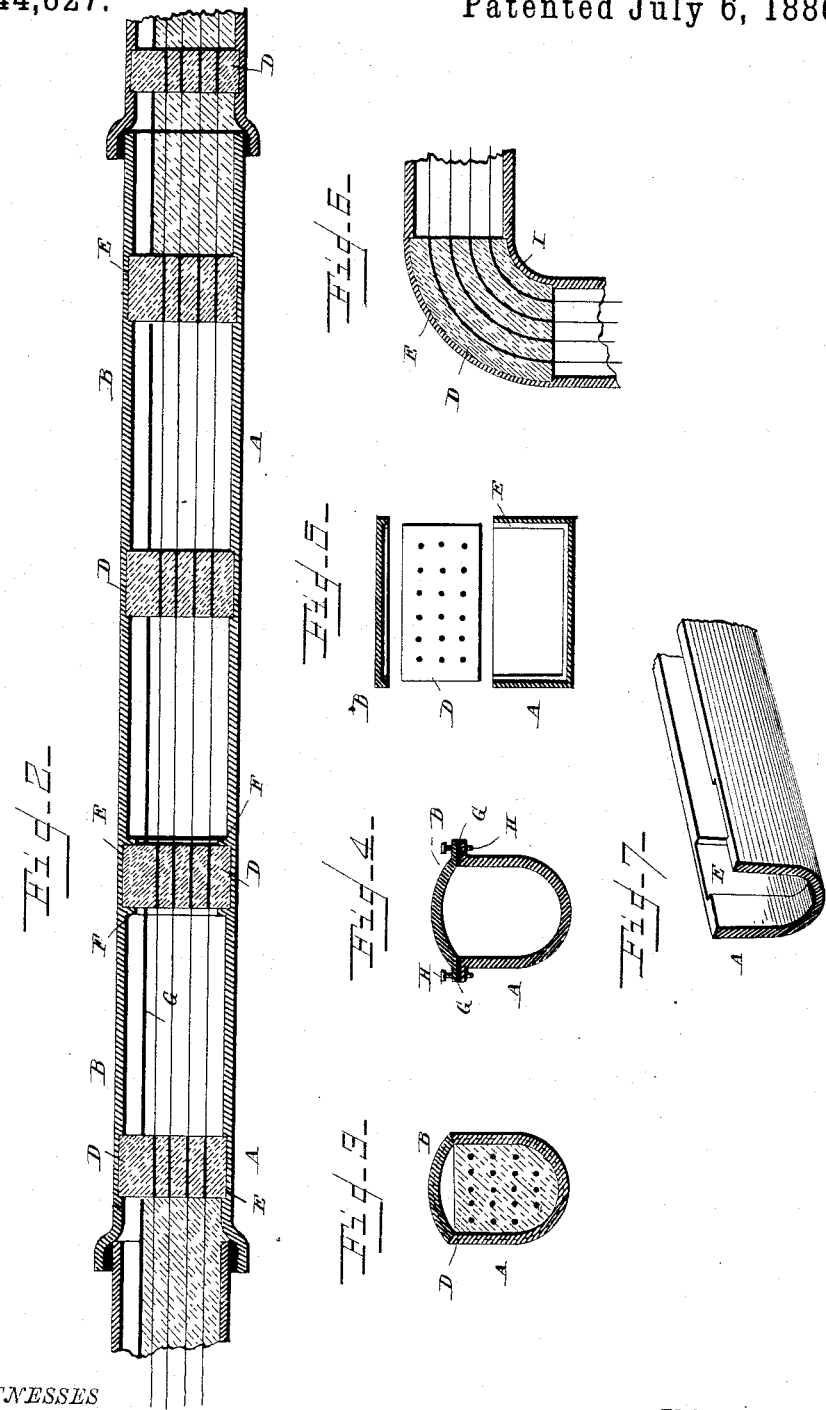
WITNESSES
Edwin T. Yewell,
Wm. T. Huntemann
INVENTOR
John Grant
By Yewell + Chapman
Attorneys.

UNITED STATES PATENT OFFICE.

JOHN GRANT, OF OMAHA, NEBRASKA.

UNDERGROUND CONDUCTOR FOR ELECTRIC WIRES.

SPECIFICATION forming part of Letters Patent No. 344,827, dated July 6, 1886.

Application filed January 9, 1886. Serial No. 188,076. (No model.)

*To all whom it may concern:*

Be it known that I, JOHN GRANT, a citizen of the United States, residing at Omaha, in the county of Douglas and State of Nebraska, have invented certain new and useful Improvements in Underground Conductors for Electric Wires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in underground conduits for electrical wires, and is designed to produce an easily-applied and as easily-removed non-conductive support and packing for the said wires, a packing that shall be sufficiently transparent to permit the ready location of breaks in the wires, and an insulating support that will retain its relative position in the conduit, permit the stretching of the wires, and prevent any movement of the parts of the casing forming the conduit proper.

The improvements covered by this invention embrace the above objects, as well as the constructions of parts and the combinations, as hereinafter described, and set forth in the claims.

In the annexed drawings, Figure 1 represents a longitudinal section of the conduit with some of the parts in elevation, showing a mode of applying the invention; Fig. 2, a longitudinal section of the conduit, showing a mode of applying the invention differing somewhat from that shown in Fig. 1; Fig. 3, a cross-section of the conduit, taken through the wire surrounding packing; Fig. 4, a cross-section showing a means of attaching the cover to the main body of the conduit; Fig. 5, a detail cross-section with the parts separated showing a form of conduit adapted to crossing obstructions, a side elevation of the same being shown in Fig. 1; Fig. 6, a detail section showing a means of turning corners, and Fig. 7 a detail perspective of the body of one of the conduit-sections, showing one of the support-seats.

In carrying the invention into practice I prefer that the conduit-casing should be constructed of metal, terra cotta, or other suitable material, in sections, and the said sections be formed of two pieces, the body A being of a general U shape in cross-section, and the cover B slightly curved laterally. This is the form that seems best adapted to the purpose; but it may be varied at pleasure.

In laying this conduit a trench is formed and the body A set therein, a bed of concrete and gravel or other suitable material being used as a foundation when the soil alone is not sufficiently firm. The wires are then placed in the manner hereinafter set forth, the cover placed in position, and the trench filled. Should the conduit be carried through some place not admitting the required depth, I change its form somewhat by increasing its width and decreasing the depth, producing sections of rectangular shape with either rounded or square corners, corresponding somewhat to that of an expanded U. When thus formed the cover may be flat, and the ends of the main portion or body are contracted laterally and made of greater depth, to correspond to and match the ends of the conduit proper. This formation is shown in Figs. 1 and 5, and the conduit ends are shown at C. At proper intervals are placed the insulating supports D, each consisting of a block of any suitable material, but preferably of glass, corresponding in size and shape to the conduit in cross-section. The supports rest in seats formed in the conduit, the said seats being grooves E on the interior of the body A and cover B, or lugs F on the said interior and operating similarly to the grooves, or any other suitable devices performing equivalent functions. The seats in the body A prevent movement of the said supports, and the seats in the covers B prevent all longitudinal movement of said covers, while the said construction does not interfere in the least with either the insertion or removal of said supports. These supports are each provided with passages for the wire, and, being normally fixed in said conduit, admit of the stretching of the said wires after being properly placed by being passed through the said passages. After having placed the supports and wires in position, as stated, the said wires should be insulated and protected from moisture, and the protecting material or "packing," as it may be called, should be such as can be easily applied, comparatively inexpensive, brittle, so as to be easily removed, and sufficiently transparent to permit the location of breaks. Such a material I find rosin to be, and I apply it in a liquid state, filling the compartments formed by the supports D till the wires are all covered. The rosin soon hardens, and is then transparent, non-conductive to electricity, brittle, and thoroughly protects and insulates the wires, and also aids in supporting the same. The cover when applied does not contact with the rosin.

To obviate the necessity of filling all the compartments with rosin, I fill those in which the joints of the conduit occur, thus avoiding water-tight connections at the said joints; and between the cover and the body of the conduit is placed a packing of felt, rubber, or other suitable material. With this method of laying the wires the supports are usually placed closer together than when all the compartments are filled with the rosin, or its equivalent. When the packing is used between the body and the cover of the conduit, as shown at G, Figs. 2 and 4, suitable fastening devices—such as screws or bolts H, Fig. 4—are used, thus compressing said packing sufficiently to make the same water-tight, and thus protect the inclosed wires.

In Fig. 6 is shown a method of carrying the wires around bends or corners.

The supports may be constructed large enough, and of the proper shape, to fill the bend or corner, as at I; or the said supports may be placed at each end of the said corner or bend, and the wires carried from one to the other in a straight line, the passages through the said supports being so placed as to prevent the said wires touching the sides of the said corner-piece. The said corner-piece or bend may then be filled with the rosin, it being provided with a cover similar to the rest of the conduit.

This invention is not confined to the exact constructions described; but the same may be varied consistent with the spirit of said invention.

I claim—

1. The combination of a conduit, electric wires contained therein, and a packing surrounding said wires, and consisting of rosin applied in a liquid state, substantially as specified.

2. A conduit for electric wires, formed of a main portion and a cover, combined with insulating wire-supports dividing said conduit into non-communicative compartments, and a water-proof insulating-packing filling the compartments in which the joints of the conduit occur, the remaining compartments being occupied only by the said wires, substantially as specified.

3. The combination, with a conduit, of glass supports for electric wires and a packing consisting of rosin surrounding the said wires, substantially as specified.

4. A conduit for electric wires, formed of a main portion or body, and a cover being provided with seats on the interior for insulating wire-supports, the seat in the cover fitting over the said wire-supports to prevent longitudinal movement of said cover, substantially as described.

5. A conduit for electric wires composed of sections and formed of a main portion or body, and a cover combined with insulating wire-supports dividing said conduit into compartments, a packing consisting of rosin filling the compartments in which the joints of the conduit occur, and a packing placed between the body and the cover, substantially as described.

In testimony whereof I affix my signature in presence of two witnesses.

JOHN GRANT.

Witnesses:
  WM. F. HUNTEMANN,
  IRA R. STEWARD.